(12) United States Patent
Aramaki

(10) Patent No.: US 9,143,768 B2
(45) Date of Patent: Sep. 22, 2015

(54) TERMINAL DEVICE AND CONTROL PROGRAM THEREOF FOR DISPLAYING DISPLAY INFORMATION IN A DISPLAY SECTION CAPABLE OF PERFORMING THREE-DIMENSIONAL DISPLAY

(75) Inventor: Tatsuo Aramaki, Higashiyamato (JP)

(73) Assignee: NEC Corporation, Tokyo (JP)

(*) Notice: Subject to any disclaimer, the term of this patent is extended or adjusted under 35 U.S.C. 154(b) by 949 days.

(21) Appl. No.: 12/732,496

(22) Filed: Mar. 26, 2010

(65) Prior Publication Data

US 2010/0323609 A1 Dec. 23, 2010

(30) Foreign Application Priority Data

Jun. 17, 2009 (JP) ................................ 2009-144000

(51) Int. Cl.
*G06F 3/048* (2013.01)
*H04N 13/04* (2006.01)
*G06T 19/00* (2011.01)

(52) U.S. Cl.
CPC ....... *H04N 13/0454* (2013.01); *H04N 13/0497* (2013.01); *G06T 19/00* (2013.01); *H04N 13/04* (2013.01); *H04N 13/0452* (2013.01); *H04N 2213/00* (2013.01); *H04N 2213/005* (2013.01)

(58) Field of Classification Search
CPC ........... G06F 3/04815; H04N 13/0454; H04N 13/04; H04N 13/0452; H04N 2213/00; H04N 2213/005; G06T 19/00
USPC ........ 715/848; 348/42, 51, E13.024, E13.044
See application file for complete search history.

(56) References Cited

U.S. PATENT DOCUMENTS

| | | | |
|---|---|---|---|
| 6,198,428 B1* | 3/2001 | Sekine | 342/176 |
| 6,285,368 B1* | 9/2001 | Sudo | 345/419 |
| 8,050,289 B1* | 11/2011 | Masterson et al. | 370/465 |
| 2002/0126202 A1* | 9/2002 | Wood et al. | 348/59 |
| 2004/0057612 A1* | 3/2004 | Tabata | 382/154 |
| 2005/0232487 A1* | 10/2005 | Fleisher | 382/181 |
| 2008/0119148 A1* | 5/2008 | Ray | 455/150.1 |
| 2008/0246964 A1* | 10/2008 | Nishiyama et al. | 356/336 |
| 2009/0011751 A1 | 1/2009 | Goto | |
| 2009/0185029 A1* | 7/2009 | Mitsuhashi et al. | 348/46 |
| 2010/0045704 A1* | 2/2010 | Kim | 345/660 |
| 2010/0103318 A1* | 4/2010 | Wang et al. | 348/565 |
| 2011/0055415 A1* | 3/2011 | Cuesta et al. | 709/231 |

FOREIGN PATENT DOCUMENTS

| | | |
|---|---|---|
| JP | 2005-049668 | 2/2005 |
| JP | 2005-266293 | 9/2005 |
| JP | 2006-121553 | 5/2006 |
| JP | 4297508 | 7/2009 |

* cited by examiner

*Primary Examiner* — Patrick Riegler
*Assistant Examiner* — Phuong Nguyen
(74) *Attorney, Agent, or Firm* — Cozen O'Connor

(57) ABSTRACT

In a mobile phone 1, when displaying content received from a television broadcast receiving section 17 or the like in a display section 19 capable of three-dimensional display, a central controlling section 11 judges the suitability in 3D display of the content based on the reception condition at the time of the content reception, and displays the content in the display section 19 in accordance with display control determined based on the suitability in 3D display. As a result, a suitable display ranging from an easy-to-view 2D display to a realistic 3D display is actualized based on a reception condition of content.

12 Claims, 11 Drawing Sheets

M3

DISPLAY CONTROL INFORMATION STORAGE SECTION

| RECEPTION CONDITION | DISPLAY CONTROL INFORMATION | |
|---|---|---|
| | 2D/3D | 3D DEPTH |
| LESS THAN THRESHOLD a | 2D | LEVEL 0 |
| THRESHOLD a OR MORE, AND LESS THAN THRESHOLD b | 3D | LEVEL 1 |
| THRESHOLD b OR MORE, AND LESS THAN THRESHOLD c | 3D | LEVEL 2 |
| THRESHOLD c OR MORE | 3D | LEVEL 3 |

DISPLAY CONTROL INFORMATION STORAGE SECTION

| RECEPTION CONDITION | DISPLAY CONTROL INFORMATION | |
| --- | --- | --- |
| | 2D/3D | 3D DEPTH |
| LESS THAN THRESHOLD a | 2D | LEVEL 0 |
| THRESHOLD a OR MORE, AND LESS THAN THRESHOLD b | 3D | LEVEL 1 |
| THRESHOLD b OR MORE, AND LESS THAN THRESHOLD c | 3D | LEVEL 2 |
| THRESHOLD c OR MORE | 3D | LEVEL 3 |

FIG. 4A

DISPLAY CONTROL FLAG — CF

| OFF | ON | |
|---|---|---|
| 0 | 1<br>3D/2D<br>AUTOMATIC<br>SWITCHING | 2<br>STRONG 3D/WEAK 3D<br>AUTOMATIC<br>SWITCHING |

FIG. 4B

| 3D/2D AUTOMATIC SWITCHING |
|---|
| SWITCHING ALLOWED |
| SWITCHING NOT ALLOWED |
| DISPLAY WILL BE SWITCHED FROM 3D TO 2D WHEN SIGNAL IS WEAK AND SWITCHED FROM 2D TO 3D WHEN SIGNAL IS STRONG |

FIG. 4C

| STRONG 3D/WEAK 3D AUTOMATIC SWITCHING |
|---|
| SWITCHING ALLOWED |
| SWITCHING NOT ALLOWED |
| DISPLAY WILL BE SWITCHED FROM STRONG 3D TO WEAK 3D WHEN SIGNAL IS WEAK AND SWITCHED FROM WEAK 3D TO STRONG 3D WHEN SIGNAL IS STRONG |

FIG. 10

CONTENT STORAGE SECTION  M4

| TITLE | TYPE | ACTUAL DATA | 3D DEPTH |
|---|---|---|---|
| TWO-DIMENSIONAL CODE | STILL IMAGE | 2D | LEVEL 0 |
| FIELD DAY 2008 | STILL IMAGE | 2D | LEVEL 0 |
| J-LEAGUE MATCH** | MOVING IMAGE | 3D | LEVEL 1 |
| SAMPLE MOVING IMAGE ** | MOVING IMAGE | 3D | LEVEL 1 |
| | | 3D | LEVEL 2 |
| SAMPLE STILL IMAGE** | STILL IMAGE | 3D | LEVEL 1 |
| | | 3D | LEVEL 2 |
| | | 3D | LEVEL 3 |
| .... | | | | ize a
TERMINAL DEVICE AND CONTROL PROGRAM THEREOF FOR DISPLAYING DISPLAY INFORMATION IN A DISPLAY SECTION CAPABLE OF PERFORMING THREE-DIMENSIONAL DISPLAY

CROSS-REFERENCE TO RELATED APPLICATION

This application is based upon and claims the benefit of priority from the prior Japanese Patent Application No. 2009-144000, filed Jun. 17, 2009, the entire contents of which is incorporated herein by reference.

BACKGROUND OF THE INVENTION

1. Field of the Invention

The present invention relates to terminal device and control program thereof for displaying display information in a display section capable of three-dimensional display.

2. Description of the Related Art

Conventionally, various techniques are used to three-dimensionally display (3D display) in a flat display section display information such as images (still images and moving images), text, and menus to enable users to stereoscopically view the display information. As a technique such as this, for example, a technique is known in which an object in two-dimensional (2D) display information can be viewed stereoscopically by a visual effect that makes the object appear three-dimensional being applied to the object.

A technique using a polygon is an example of this technique. A technique is also known that uses binocular disparity between the right eye and the left eye of the user. That is, in this technique, display information for the right eye and display information for the left eye that are slightly misaligned with each other are provided, and an electronic parallax barrier (switching liquid crystal panel) that blocks light paths is placed in an appropriate position such that, when these two display information are simultaneously shown, the display information for the right eye is visible to the right eye but not to the left eye, and the display information for the left eye is visible to the left eye but not to the right eye. As a result, the display information appears three-dimensional.

All 3D display techniques described above use a parameter referred to as 3D depth that indicates the depth of 3D or the extent of outward projection. The stronger the 3D depth is, the deeper or more outwardly projecting the display information appears to the user. On the other hand, the weaker the 3D depth is, the shallower or less outwardly projecting the display information appears. When the 3D depth is zero, the display information appears two-dimensional (in other words, 2D display).

A display system is conventionally known that uses an electronic parallax barrier to convert flat (2D)/three-dimensional (3D) images accordingly and display the converted images (refer to, for example, Japanese Patent Application Laid-Open (Kokai) Publication No. 2006-121553).

However, there is a problem in that, although signal strength is not often directly reflected in digital television broadcasts unlike in analog broadcasts, for example, when 3D display is performed in a situation where signal reception is poor, the effect of 3D display is not achieved because of an increase in block noise, and images that are more difficult to view are displayed to the user.

Furthermore, 3D processing consumes a large amount of energy, and therefore constant 3D display is not preferable in terms of power consumption.

SUMMARY OF THE INVENTION

The present invention has been conceived to solve the above-described problems. An object of the present invention is to provide a terminal device that is capable of actualizing a suitable display in accordance with an environment in which display information is displayed in a display section capable of 3D display.

In order to achieve the above-described object, in accordance with one aspect of the present invention, there is provided a terminal device that displays display information in a display section capable of performing three-dimensional display, comprising: a reception means for receiving the display information; a reception environment acquisition means for acquiring a reception environment at the time of reception of the display information by the reception means; a judgment means for judging suitability in three-dimensional display of the display information based on the reception environment acquired by the reception environment acquisition means; a determination means for determining which display control to be performed when the display information is displayed in the display section based on the suitability in three-dimensional display judged by the judgment means; and a display control means for displaying the display information in the display section in accordance with the display control determined by the determination means.

In accordance with another aspect of the present invention, there is provided a terminal device that plays back display information in a display section capable of performing three-dimensional display, comprising: a location acquisition means for acquiring current location information at the time of playback of the display information in the display section; a judgment means for judging suitability in three-dimensional display of the display information based on the location information acquired by the location acquisition means; a determination means for determining which display control to be performed when the display information is displayed in the display section based on the suitability in three-dimensional display judged by the judgment means; and a display control means for displaying the display information in the display section in accordance with the display control determined by the determination means.

In accordance with another aspect of the present invention, there is provided a computer-readable storage medium having stored thereon a program that is executable by a computer, the program being executable by the computer to perform a process comprising: processing for receiving display information; processing for acquiring a reception environment at the time of reception of the display information; processing for judging suitability in three-dimensional display of the display information based on the acquired reception environment; processing for determining which display control to be performed when the display information is displayed in a display section based on the judged suitability in three-dimensional display; and processing for displaying the display information in the display section in accordance with the determined display control.

In accordance with another aspect of the present invention, there is provided a computer-readable storage medium having stored thereon a program that is executable by a computer, the program being executable by the computer to perform a process comprising: processing for acquiring current location information at the time of playback of display information in a display section; processing for judging suitability in three-dimensional display of the display information based on the acquired current location information; processing for determining display control to be performed when the display information is displayed in the display section based on the judged suitability in three-dimensional display; and processing for displaying the display information in the display section in accordance with the determined display control.

According to the present invention, in a terminal device, a suitable display can be actualized in accordance with an environment in which display information is displayed in a display section capable of three-dimensional display. Therefore, the present invention has excellent practicability.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram for explaining a display control information storage section M3;

FIG. 4A is a diagram for explaining a display control flag CF;

FIG. 4B is a diagram showing a setting screen when "1" of the display control flag CF is selected;

FIG. 4C is a diagram showing a setting screen when "2" of the display control flag CF is selected;

FIG. 10 is a diagram for explaining a content storage section M4 according to the fourth embodiment.

DETAILED DESCRIPTION OF THE PREFERRED EMBODIMENTS

The present invention will hereinafter be described in detail with reference to the preferred embodiments shown in the accompanying drawings.

(First Embodiment)

A first embodiment of the present invention will hereinafter be described with reference to FIG. 1 to FIG. 5.

Figure 1:
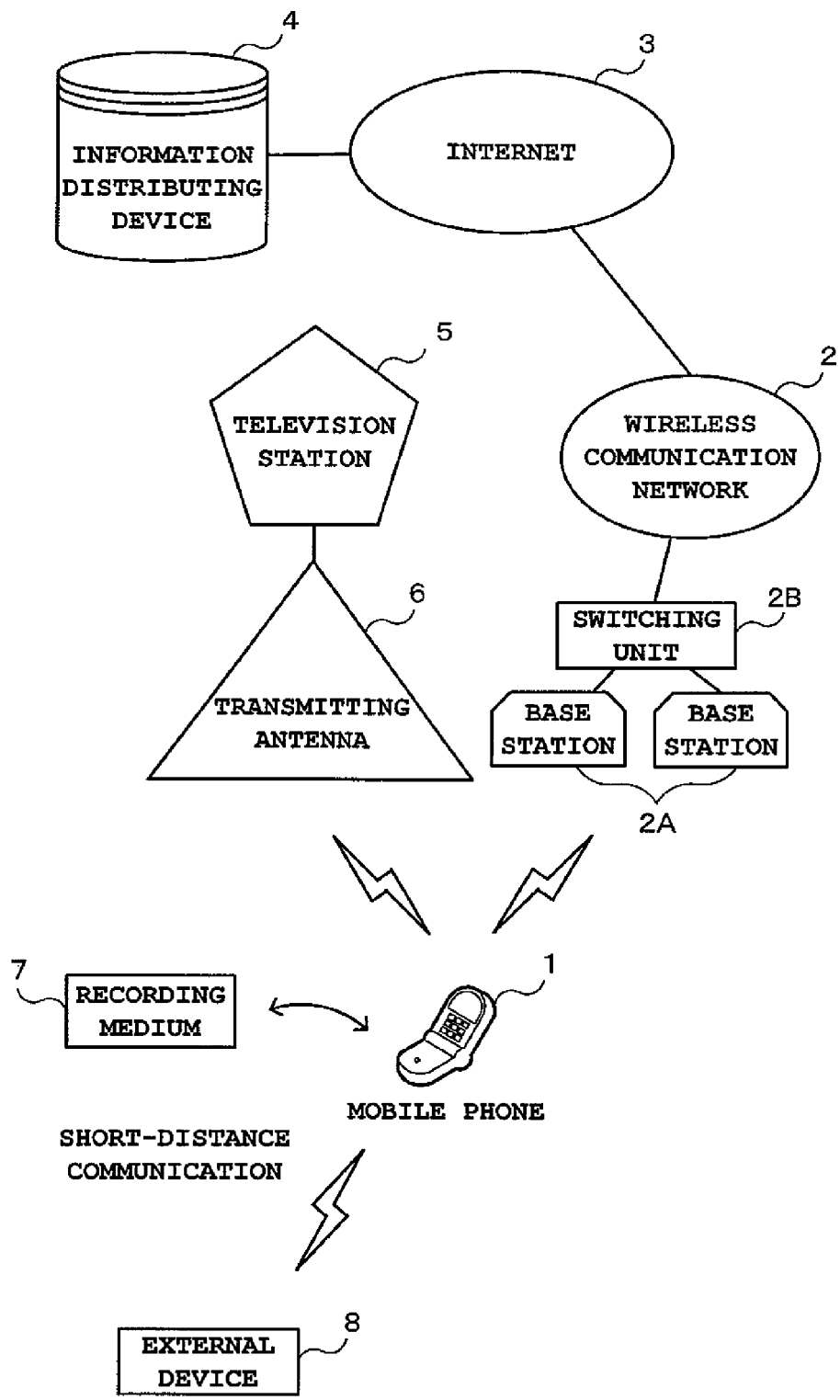
FIG. 1 is a block diagram showing a communication network system in which a mobile phone serving as a terminal device can be used.

First, the first embodiment is an example in a case where a mobile phone serves as a terminal device, and FIG. 1 is a block diagram of a communication network system in which this mobile phone can be used.

In FIG. 1, a mobile phone 1 provides a call function, an electronic mail function, an Internet connection function (web access function), and a camera function. In addition, the mobile phone 1 provides a television function for receiving and viewing digital television broadcasts (such as one segment terrestrial digital television broadcasts), a three-dimensional (3D) display function, a picture-recording function, etc. The 3D display function shows, using a parallax barrier method that takes advantage of binocular disparity between the left and right eyes, display information (contents) such as moving images, still images, text, and menus with 3D depth indicating the depth of 3D or the extent of outward projection, rather than showing them two-dimensionally (2D). The picture-recording function, which enables picture-recording (including audio-recording; the same applies hereinafter) of received contents such as television broadcasts, is a content recording function that performs audio-recording in addition to picture-recording.

When the mobile phone 1 is connected to a wireless communication network (mobile communication network) 2 from the nearest base station 2A and switching unit 2B, a connection can be established between the mobile phone 1 and another mobile phone 1 via the wireless communication network 2. Also, when the mobile phone 1 is connected to the Internet 3 via the wireless communication network 2, websites can be accessed and viewed. In addition, multimedia contents such as moving images, still images, music, and news can be downloaded for streaming playback from an information distributing device 4 via the Internet 3 and the wireless communication network 2, and replayed.

The mobile phone 1 receives terrestrial digital broadcasts (broadcast contents) transmitted from a television station 5 through a transmitting antenna 6. However, as in the case of Internet radio, digital broadcasts can be downloaded and received from the information distributing device 4 via the wireless communication network 2 and the Internet 3. In addition to being capable of receiving broadcast contents via the television function and downloading streaming contents via the Internet connection function as just described, the mobile phone 1 is capable of acquiring various contents from a recording medium 7 such as a detachable portable memory card, and acquiring various contents from an external device such as another mobile phone by short-distance communication such as Bluetooth (registered trademark) communication and infrared communication.

Figure 2:
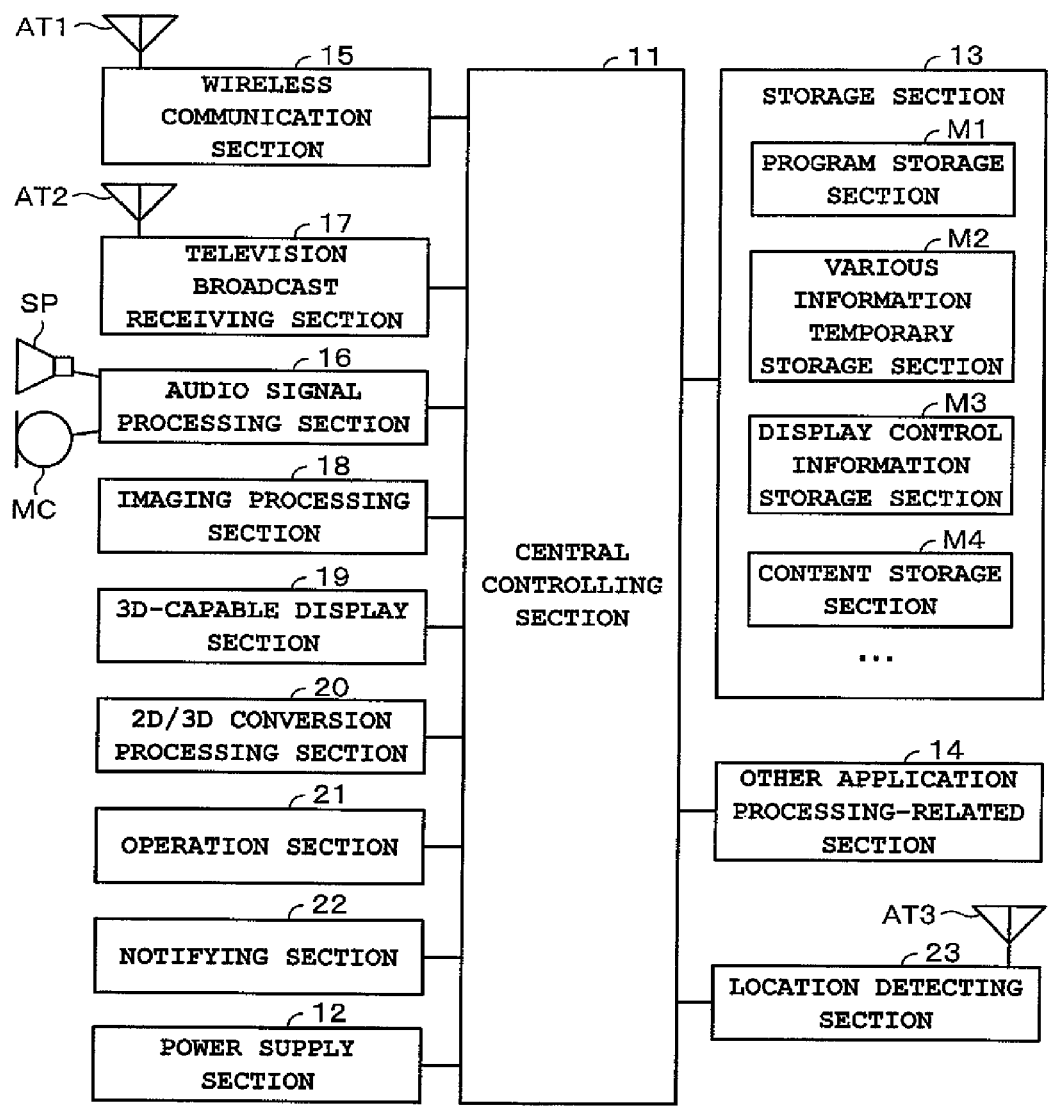
FIG. 2 is a block diagram showing basic components of a mobile phone 1.

FIG. 2 is a block diagram showing basic components of the mobile phone 1.

In FIG. 2, a central controlling section 11 operates using power supplied from a battery section 12 including a secondary battery, and includes a central processing unit, a memory, etc. The central processing unit controls overall operations of the mobile phone 1 based on various programs stored in a storage section 13, and this storage section 13 includes a program storage section M1, a various information temporary storage section M2, a display control information storage section M3, a content storage section M4 (content recording means) used in a third embodiment described hereafter, etc. The storage section 13 may be configured to include a detachable portable memory (recording medium) such as a secure digital (SD) card or an integrated circuit (IC) card. Also, the storage section 13 may be provided on a predetermined external server (not shown).

Here, the central controlling section 11 actualizes functions of a judgment means, a determination means, a reception environment acquisition means, a distance acquisition means, and a location acquisition means.

Figure 5:
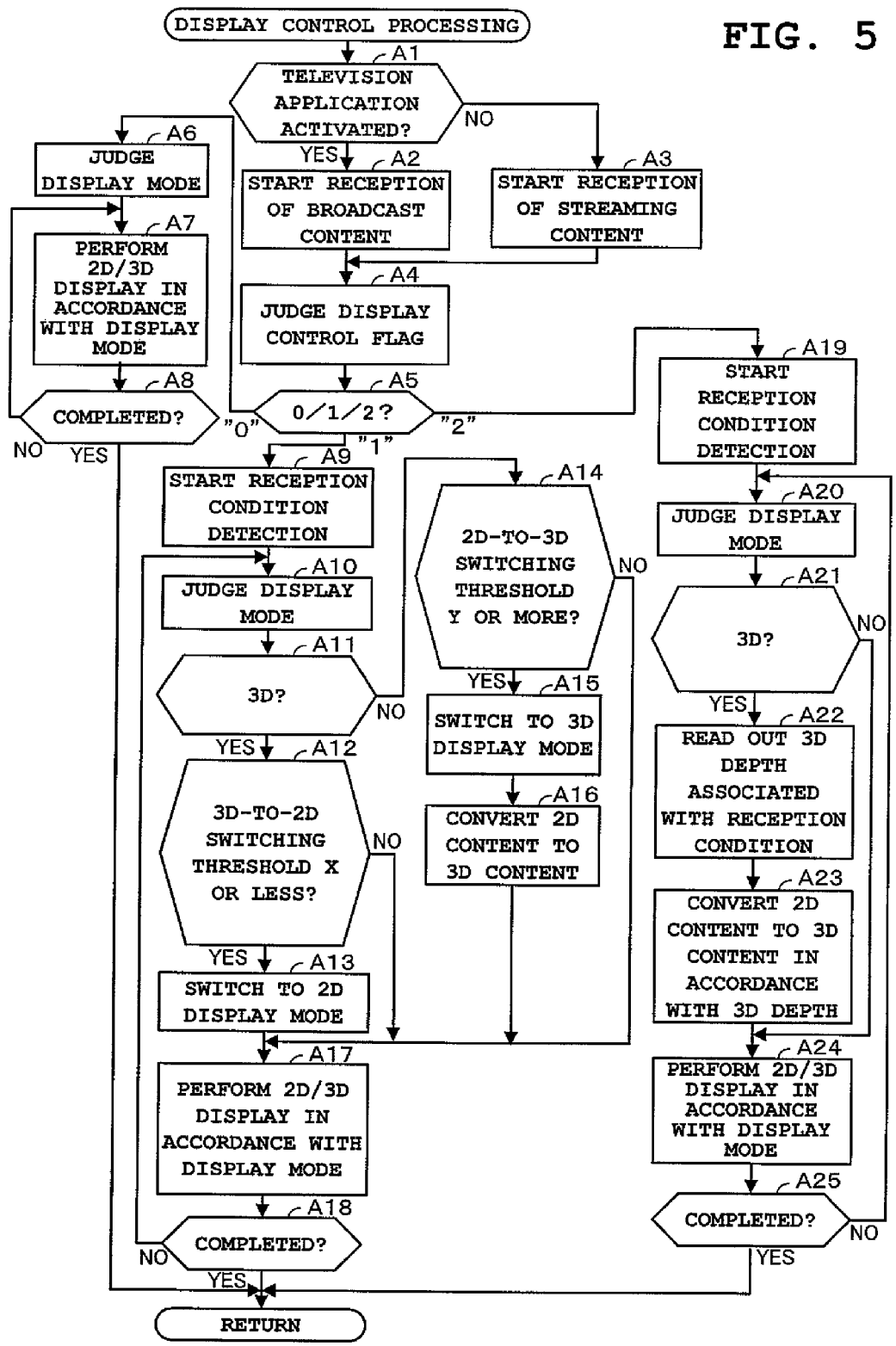
FIG. 5 is a flowchart of display control processing that is initiated by the activation of a viewer application such as a television application.

The program storage section M1 stores therein programs, various applications, and the like for actualizing the embodiment according to operation procedures shown in FIG. 5. The program storage section M1 also stores therein information and the like required by the programs and applications. The various information temporary storage section M2 is a work area temporarily storing therein various information required for the operation of the mobile phone 1, such as flag information, timer information, and screen information. The display control information storage section M3 will be described in detail hereafter.

An other application processing-related section 14 stores information related to application processing of the electronic mail function, the Internet connection function, the camera function, the television function, and the like, and performs control related to these processing. A wireless communication section 15 (reception means and content reception means) includes a wireless section, a baseband section, a demultiplexing section, and the like, and exchanges data with the nearest base station 2A during the operation of, for example, the call function, the electronic mail function, or the Internet connection function. When the call function is running, the wireless communication section 15 receives signals from the receiving side of the baseband section, and after demodulating the signals into received baseband signals, outputs the received baseband signals from a call speaker SP as audio via an audio signal processing section 16. The wireless communication section 15 also receives, from the audio signal processing section 16, audio data inputted from a call microphone MC, and after encoding the audio data into transmission baseband signals, sends the encoded transmission baseband signals to the transmitting side of the baseband section, and transmits the encoded transmission baseband signals from an antenna AT 1.

A television broadcast receiving section 17 (reception means, broadcast reception means, first reception means, and second reception means), which includes a receiving section (analog circuit section) and a digital circuit section, constitutes the television function and is capable of receiving one segment terrestrial digital television broadcasts for communication terminal devices, as well as program information such as an electronic program guide (EPG information). The receiving section extracts broadcast signals of a pre-selected channel from television broadcast signals received by a television antenna AT2. The digital circuit section performs orthogonal frequency-division multiplexing (OFDM) demodulation on received broadcast signals, separates and decodes multiplexed broadcast signals into video, audio, and data (text data) signals, decompresses compressed data, etc.

An imaging processing section 18, which constitutes a camera function capable of shooting still images and moving images, includes a lens and mirror block including an imaging lens and a mirror, an image sensor and a drive system therefor, a distance sensor, a light quantity sensor, an analog processing circuit, a signal processing circuit, a compression/expansion circuit, and the like, and controls the adjustment of optical zoom, auto-focus and manual focus performed by user operation to adjust focus during shooting, the driving of the shutter, exposure, white balance, and the like.

A 3D-capable display section 19 (display section) uses high-definition liquid crystal to show display information (contents) such as text information, wallpaper images, television pictures, and captured images. A liquid crystal layer for generating a parallax barrier is provided on the front surface of this display section 19, thereby allowing 3D display. A 2D/3D conversion processing section 20 converts 2D content to content for the right eye and content for the left eye in accordance with 3D depth, converts 3D content to content having a different 3D depth, and converts 3D content to 2D content. The content converted by the 2D/3D conversion processing section 20 is displayed in the display section 19 in 3D or 2D. Note that the 2D/3D conversion processing section 20 and the central controlling section 11 actualize functions of a display control means.

An operating section 21 is used to perform dial-input, text-input, command-input, etc. The central controlling section 11 performs processing based on input operation signals from this operating section 21. Note that the operating section 21 and the central controlling section 11 actualize functions of a setting means, a first selection means, and a second selection means.

A notifying section 22, which includes a sound speaker, a light-emitting diode (LED) lamp, and a vibration motor (not shown), is driven when an incoming call is received and notifies of the incoming call. The notifying section 22 is also driven during alarm notification and the like. A location detecting section 23, which constitutes a global positioning system (GPS) receiving section, receives a current location (longitudinal and latitudinal information) from an antenna AT3 using a GPS satellite (not shown) and a ground station. The central controlling section 11 accesses this location detecting section 23 to acquire current location information.

FIG. 3 is a diagram for explaining the display control information storage section M3.

In FIG. 3, the display control information storage section M3 is configured to associate and store "reception condition" and "display control information". "Reception condition" indicates a reception environment in which content to be displayed is received, and "display control information" indicates whether content is displayed in the display section 19 in 2D or in 3D based on "reception condition". When content is to be displayed in 3D, "display control information" also indicates at what 3D depth (intensity) this content is displayed in accordance with the suitability level in 3D display.

Details of the display control information storage section M3 can be optionally set by user operation, and therefore some of the default details set in advance by the manufacturer can be changed by user operation. The central controlling section 11 references the display control information storage section M3 to judge the suitability in 3D display of content based on the reception environment in which broadcast content or streaming content is received as a display subject, and after determining the display control based on this suitability in 3D display, displays the content in the display section 19 in 2D or 3D in accordance with this display control.

Here, "suitability in 3D display" refers to a plurality of judgment conditions that are categorized for determining which display mode, including 3D display mode and 2D display mode, is suitable for displaying targeted information in the display section 19.

Specifically, the details of the judgment criterion are as follows.

"Reception condition" indicates a reception condition (signal strength) serving as a reception environment in which content is received. In the example in FIG. 3, this "reception condition" includes "less than threshold a", "threshold a or more, and less than threshold b", "threshold b or more, and less than threshold c", and "threshold c or more" as ranges indicating signal strength, and the relationship among these thresholds is $a<b<c$. "Display control information" associated with "reception condition", which is used to determine display control to be performed based on the current "reception condition", includes "2D/3D" that indicates whether content is to be displayed in 2D or in 3D, and "3D depth" that indicates in accordance with the suitability level the 3D depth (intensity) to be used when the content is displayed in 3D.

"3D depth" indicates the depth of 3D or the extent of outward projection of content, and is set to "level 3", "level 2", "level 1", or "level 0". The relationship of these levels is, in the order of depth from strong depth (high resolution depth) to weak depth (low resolution depth), level 3>level 2>level 1>level 0. "Level 0" indicates that 3D depth is at "level zero" and indicates 2D (flat) display. Therefore, contents with "3D depth" of "level 0" are displayed in 2D. Note that, in the example in "2D/3D" in FIG. 3, "2D", "3D", "3D", and "3D" have been stored in association with "less than threshold a", "threshold a or more, and less than threshold b", "threshold b or more, and less than threshold c", and "threshold c or more", respectively. Additionally, in "3D depth", "level 0" has been stored in association with "less than threshold a", "level 1" has been stored in association with "threshold a or more, and less than threshold b", "level 2" has been stored in association with "threshold b or more, and less than threshold c", and "level 3" has been stored in association with "threshold c or more". This display control is performed such that 3D depth becomes stronger as the reception condition improves.

FIG. 4A, FIG. 4B, and FIG. 4C are diagrams for explaining a display control flag CF.

The display control flag CF shown in FIG. 4A is used to select whether or not to perform the above-described display control in accordance with a reception condition. Also, the display control flag CF is used to further select, when the display control is to be performed, whether or not to switch between 3D display and 2D display, or to switch 3D depth. Any of "0", "1", and "2" can be selected by user operation. Here, the flag "0" indicates a state in which display control in accordance with a reception condition is not performed (OFF), and the flag "1" and the flag "2" indicate a state in which display control in accordance with a reception condition is performed (ON). Of the flags "1" and "2" instructing that display control be performed, the flag "1" indicates that switching is performed between 3D display and 2D display in accordance with a reception condition, and the flag "2" indicates that 3D depth is changed in accordance with a reception condition.

FIG. 4B is a diagram showing a setting screen when "1" is selected for the display control flag CF. In the setting screen, a message is displayed indicating that switching between 3D display and 2D display is performed in accordance with a reception condition. In addition, "switching allowed" and "switching not allowed" are displayed as selection items. When "switching allowed" is selected from the selection items by user operation, the display control flag CF is set to "1". FIG. 4C is a diagram showing a setting screen when "2" is selected for the display control flag CF. In the setting screen, a message is displayed indicating that 3D depth is switched in accordance with a reception condition. In addition, "switching allowed" and "switching not allowed" are displayed as selection items. When "switching allowed" is selected from the selection items by user operation, the display control flag CF is set to "2". When "switching not allowed" is selected by user operation in the setting screens in FIG. 4B and FIG. 4C, the display control flag CF is set to "0".

Note that, in the first embodiment, as shown in FIG. 4A, FIG. 4B, and FIG. 4C, "0", "1", or "2" can be selected for the display control flag CF. However, this selection may be further divided to enable the selection of "0", "1", "2", "3", or "4". That is, although the display control flag CF being set to "1" or "2" indicates that the selection of switching between 3D and 2D is made in accordance with a reception condition as described above, this selection may be further divided, the flag "1" may indicate that the selection of switching from 3D to 2D is made when a reception condition weakens, and the flag "2" may indicate that the selection of switching from 2D to 3D is made when a reception condition strengthens. Also, as in the case of the flag "1" or "2" described above, the display control flag CF being set to "3" or "4" indicates that the selection of switching 3D depth is made in accordance with a reception condition. However, this selection may be further divided, the flag "3" may indicate that the selection of switching from a 3D depth of "level 2"/"level 3" (medium/strong) to a 3D depth of "level 1" (weak) is made when a reception condition weakens, and the flag "4" may indicate that the selection of switching from a 3D depth of "level 1" (weak) to a 3D depth of "level 2"/"level 3" (medium/strong) is made when a reception condition strengthens.

Next, the operation concept of the mobile phone 1 according to the embodiment will be described with reference to the flowchart in FIG. 5. Note that each function described in this flowchart is stored in a readable program code format, and operations in accordance with the program codes are sequentially performed. In addition, operations in accordance with the program codes transmitted from a transmission medium such as a network can also be sequentially performed, and the same applies to other embodiments described hereafter. That is, operations unique to the embodiment can be performed using programs and data provided from an external source via a transmission medium besides a recording medium. Also note that FIG. 5 is a flowchart showing an operations outline for the characteristic portion of this embodiment from among all of the operations of the mobile phone 1. When the mobile phone 1 exits the flow in FIG. 5, it returns to the main flow (not shown) of the overall operation.

FIG. 5 is a flowchart showing display control processing that is initiated by the activation of a viewer application such as a television application.

Initially, the central controlling section 11 judges whether or not the television application has been activated (Step A1) in response to a content reception and playback operation (real-time playback operation). When judged that the television application has been activated (YES at Step A1), the central controlling section 11 starts the reception of broadcast content (2D display content) from the television broadcast receiving section 17 as content to be displayed (Step A2). When judged that the Internet connection function has been activated (NO at Step A1), the central controlling section 11 starts the reception of streaming content (2D display content) from the wireless communication section 15 as content to be displayed (Step A3).

Next, the central controlling section 11 checks the display control flag CF set in advance (Step A4) and judges whether the value of the display control flag CF is any of "0", "1", or "2" (Step A5). When judged that the flag is "0", since it is a case where a state in which display control in accordance with a reception condition is not performed (OFF) has been selected, the central controlling section 11 proceeds to Step A6, and judges whether 2D display mode has been designated as the current display mode or 3D display mode has been designated as the current display mode. Note that the 2D display mode herein refers to a display mode in which received content is displayed in 2D, and the 3D display mode herein refers to a display mode in which received content is displayed in 3D. Next, based on a judgment result at Step A6, the central controlling section 11 performs 2D/3D display processing in accordance with this display mode at subsequent Step A7.

In the 2D/3D display processing, the 2D display mode and the 3D display mode can be cyclically switched by a display mode switching operation performed by a predetermined key. When judged that the 2D display mode has been designated by the display mode switching operation, the received content is displayed in the display section 19 in 2D. When judged that the 3D display mode has been designated, the received content is displayed in the display section 19 in 3D. At this time, the 2D/3D conversion processing section 20 performs processing for converting received 2D content to content for the right eye and content for the left eye in accordance with the 3D depth, and the received content after the conversion is displayed in 3D. Hereafter, the central controlling section 11 continues the 2D/3D display processing (Step A7) until the end of the received content is detected or a user operation instructing the completion of display is performed (Step A8). The display control processing in FIG. 5 is completed in response to this detection of completion at Step A8.

At Step A4 and Step A5, when judged that the flag is "1" as a result of the judgment of the display control flag CF (Step A4 and Step A5), since it is a case where a state in which display control in accordance with a reception condition is performed (ON) has been selected, the central controlling section 11 proceeds to Step A9 and initiates a reception condition detection operation in the television broadcast receiving section 17 or the wireless communication section 15 which is receiving the content. This reception condition detection operation is to detect a reception condition (signal strength) in the television broadcast receiving section 17 based on broadcast signals received by its antenna, or to detect a reception condition (signal strength) in the wireless communication section 15 based on signals received by its antenna. Note that, in the detection of a reception condition (signal strength), for example, whether a strong signal level has been continued for about a second or a weak signal level has been continued for about a second may be detected as the signal strength.

Next, the central controlling section 11 judges whether the 2D display mode has been designated as the current display mode or the 3D display mode has been designated as the current display mode (Step A10). When judged that the 3D display mode has been designated (YES at Step A11), the central controlling section 11 judges whether or not the current reception condition is a 3D-to-2D switching threshold X or less (Step A12). When judged that the reception condition is poor and is the switching threshold X or less (YES at Step A12), the central controlling section 11 switches the 3D display mode to the 2D display mode (Step A13), and proceeds to the 2D/3D display processing in accordance with the display mode to display the received content in the display section 19 in 2D (Step A17).

When judged that the 2D display mode has been designated (YES at Step A11), the central controlling section 11 judges whether or not the current reception condition is a 2D-to-3D switching threshold Y or more (Step A14). When judged that the reception condition is good and is the switching threshold Y or more (YES at Step A14), the central controlling section 11 switches the 2D display mode to the 3D display mode (Step A15), and converts the received content for 2D display to content for 3D display (Step A16). At this time, the 2D/3D conversion processing section 20 performs processing for converting received content for 2D display to 3D content for the right eye and 3D content for the left eye. Then, the central controlling section 11 proceeds to the 2D/3D display processing in accordance with the display mode (Step A17) to display the received content after conversion in 3D, and displays the received content in the display section 19 in 3D. Hereafter, the central controlling section 11 returns to the above-described Step A10 and performs the above-described operation (Step A10 to Step A18) until the end of the received content is detected or a user operation instructing the completion of display is performed (Step A18). The display control processing in FIG. 5 is completed in response to this detection of completion at Step A18.

At Step A4 and Step A5, when judged that the flag is "2" as a result of the judgment of the display control flag CF (Step A4 and Step A5), since it is a case where a state in which display control in accordance with a reception condition is performed (ON) has been selected, the central controlling section 11 initiates a reception condition detection operation in the television broadcast receiving section 17 or the wireless communication section 15 which is receiving the content. (Step A19). After the judgment of the current display mode (Step A20), when judged that the display mode is the 2D display mode (NO at Step A21), the central controlling section 11 proceeds to the 2D/3D display processing in accordance with the display mode (Step A24). Conversely, when judged that the display mode is the 3D display mode (YES at Step A21), the central controlling section 11 references the display control information storage section M3 to read out the "3D depth" associated with the current reception condition (Step A22), and converts the received 2D content to content for 3D display in accordance with the "3D depth" (Step A23).

At this time, the 2D/3D conversion processing section 20 performs processing for converting received 2D content to content for the right eye and content for the left eye in accordance with the 3D depth. Then, the central controlling section 11 acquires the received content after the conversion and displays the content in the display section 19 in 3D with the read "3D depth" (Step A24). Hereafter, the central controlling section 11 returns to the above-described Step A20 and performs the above-described operation until the end of the received content is detected or a user operation instructing the completion of display is performed (Step A25). The display control processing in FIG. 5 is completed in response to this detection of completion at Step A25.

As described above, in the first embodiment, when displaying received content by the display section 19 capable of 3D display, the central controlling section 11 judges the suitability in 3D display of the content based on the reception condition when the content is received, and displays the content in the display section 19 in accordance with display control determined based on this suitability in 3D display. Therefore, a suitable display ranging from an easy-to-view 2D display to a realistic 3D display can be actualized based on a reception condition of content. When 3D display is performed in a situation where the signal condition is poor, the effect of 3D display is not achieved because of an increase in block noise, and the image becomes more difficult to view. However, in this instance, 2D display is performed when the signal condition is poor. Therefore, an excellent practicability can be achieved in that advantages in terms of visibility and power consumption can be obtained.

Also, in the first embodiment, a reception condition when broadcast content is received from the television broadcast receiving section 17 is acquired as the reception environment, and the suitability in 3D display of the content is judged based on this reception condition. Therefore, the display control of broadcast content can be suitably performed based on the reception condition at the time of the reception.

In addition, when content is received via a network for real-time playback, the suitability in 3D display of the content is judged based on the reception condition. Therefore, the display control of content received via a network can be suitably performed based on the reception condition at the time of the reception.

Moreover, since control is performed regarding whether content is to be displayed in 2D or 3D based on the suitability in 3D display of the content, 2D display and 3D display can be switched appropriately.

Furthermore, since 3D display is performed by 3D depth indicating the depth of 3D or the extent of outward projection being determined based on suitability in 3D display, 3D depth can be controlled based on the contents of content.

Still further, since 3D depth is determined in accordance with the level of suitability in 3D display, content more suitable for 3D display can be displayed with a stronger 3D depth.

Yet still further, since the details of the display control information storage section M3 for judging suitability for 3D display can be optionally set by user operation, a realistic 3D display can be actualized based on user preference.

Yet still further, the display control flag CF, by which whether or not to perform display control based on suitability for 3D display (ON/OFF) can be optionally selected by user operation, is provided, and by the value of this display control flag CF being set to "0"/"1" or "2", display control in accordance with this selection result can be performed. Therefore, whether or not to perform display control in accordance with suitability for 3D display can be controlled in accordance with user request.

Yet still further, the display control flag CF, by which whether to switch between 2D display and 3D display or change 3D display depth can be selected, is provided, and by the value of this display control flag CF being set to "1"/"2", display control in accordance with this selection result can be performed. Therefore, whether to switch between 2D display and 3D display or change 3D display depth can be controlled in accordance with user request. That is, when signal reception is poor, whether to display the content in 2D or in weak 3D can be selected by user operation to improve the visibility of the content. Additionally, when signal reception is good, whether to display the content in 3D or in strong 3D can be selected by user operation so that the content display be realistic.

Figure 6:
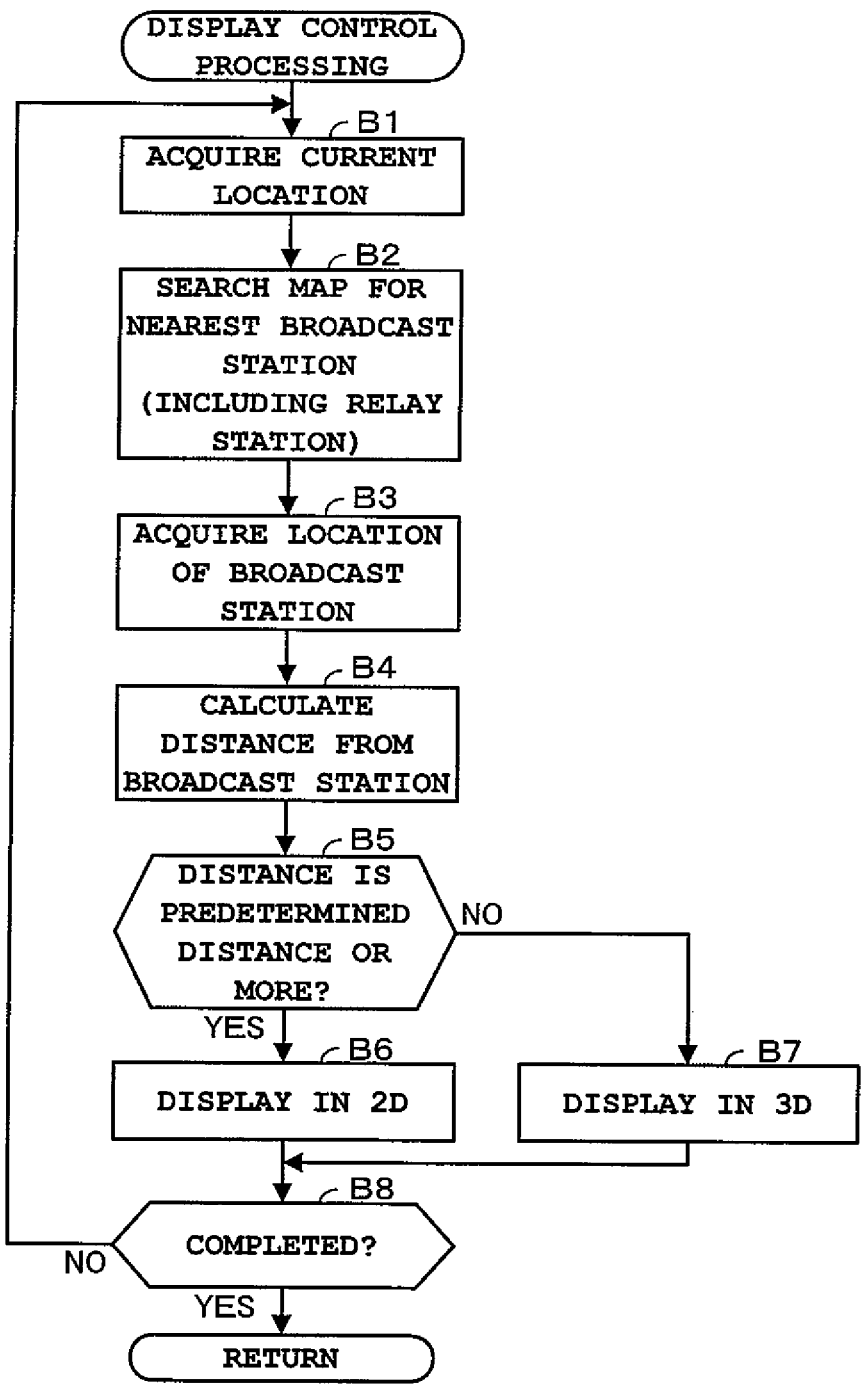
FIG. 6 is a flowchart of display control processing that is initiated when the reception of a television broadcast is started in response to a start-up operation of a television function, in a variation example of a first embodiment.

Note that, in the above-described first embodiment, signal strength is detected as a reception condition at the time of content reception. However, when a reception condition detection function such as this is not provided, the distance from a content transmission point to the current point may be measured, and the reception condition may be estimated based on the measured distance. In other words, the distance from a transmission point may be measured as a factor for estimating a reception condition. FIG. 6 is a flowchart for explaining display control processing that is a variation example of the first embodiment.

FIG. 6 is a flowchart of display control processing that is initiated when the reception of a television broadcast is started in response to a start-up operation of the television function.

Initially, when the reception of a television broadcast is started in response to a start-up operation of the television function, the central controlling section 11 acquires current location information from the location detecting section 23 (Step B1), and after searching for a nearest broadcast station (including relay stations) on a map based on a surrounding area map including the current location (Step B2), acquires location information of the broadcast station (Step B3). The central controlling section 11 then calculates the distance (linear distance) from the broadcast station based on the location information of the broadcast station and the current location information (Step B4).

Next, the central controlling section 11 judges whether or not the distance from the broadcast station to the current location is a predetermined distance or more, or in other words, judges whether or not the mobile phone 1 is within an area where the reception condition is good (Step B5). When the distance is the predetermined distance or more and the mobile phone 1 is not in an area where the reception condition is good (YES at Step B5), the central controlling section 11 displays the received broadcast content in 2D (Step B6). When the distance is less than the predetermined distance and the mobile phone 1 is an area where the reception condition is good (NO at Step B5), the central controlling section 11 displays the received broadcast content in 3D (Step B7). Hereafter, the central controlling section 11 returns to the above-described Step B1 and performs the above-described operation until the reception of the broadcast content is completed (Step B8).

As just described, in the display controlling processing shown in FIG. 6, the distance from a broadcast station to the current location is acquired as a reception condition of broadcast content, and the suitability in 3D display of the broadcast content is judged based on this reception condition. Therefore, 2D display and 3D display can be switched based on the distance from a broadcast station to the current location.

(Second Embodiment)

Next, a second embodiment of the present invention will be described with reference to FIG. 7.

In the above-described first embodiment, when received content is displayed in 2D or 3D based on the reception condition at the time of the reception, this received content is replayed in real-time. However, in the second embodiment, received broadcast content is picture-recorded (includes audio-recording; the same applied hereinafter), and then, at the time of the playback, displayed in 2D or 3D based on the reception condition. Note that sections that are basically the same or having the same name in both embodiments are given the same reference number, and explanations thereof are omitted. Hereafter, the second embodiment will be described focusing on characteristic portions thereof.

Figure 7:
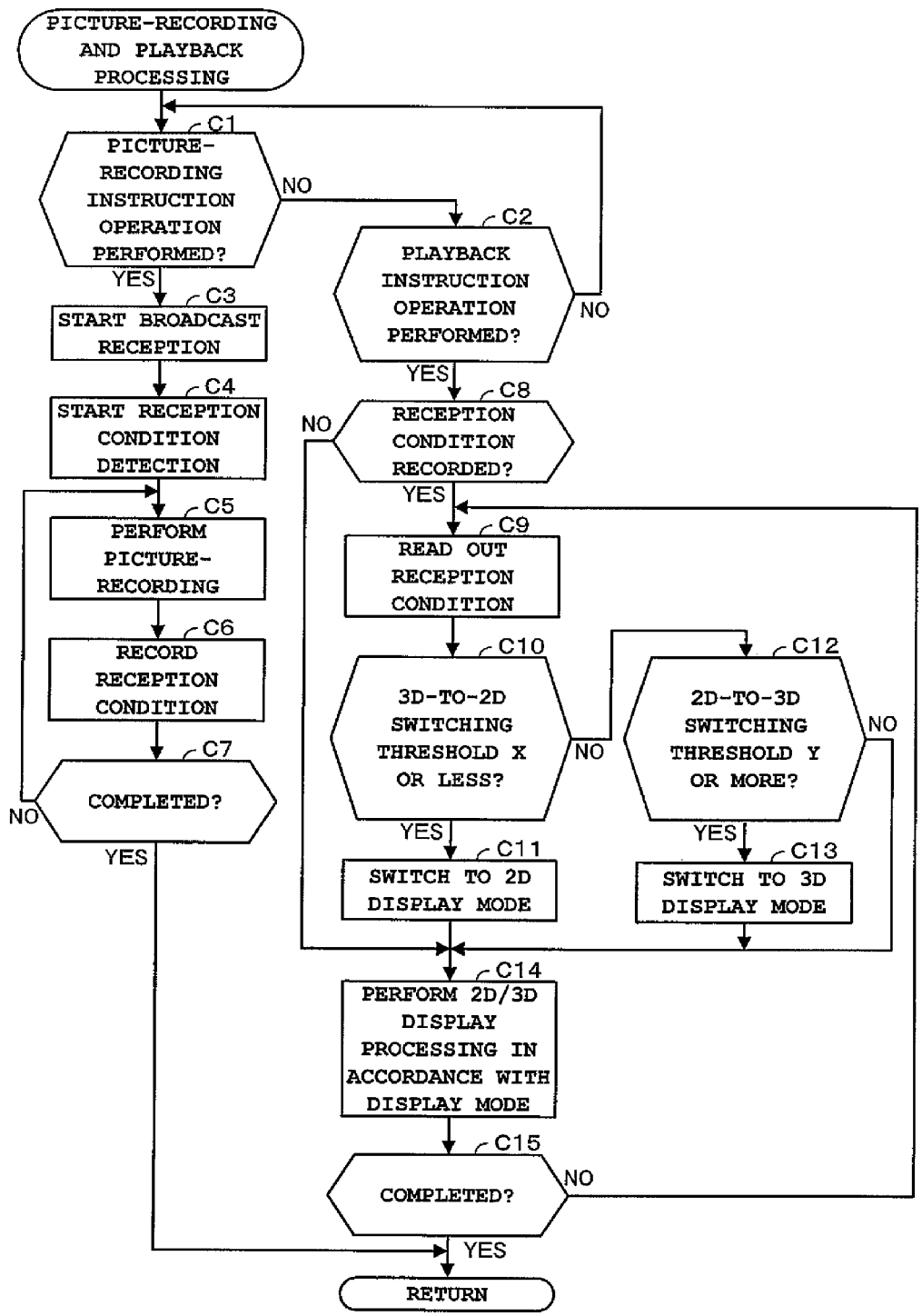
FIG. 7 is a flowchart showing picture-recording and playback processing of broadcast content in a second embodiment.

FIG. 7 is a flowchart of picture-recording and playback processing of broadcast content according to the second embodiment.

Initially, the central controlling section 11 judges whether or not a picture-recording instruction operation for instructing the picture-recording of broadcast content has been performed (Step C1), and also judges whether or not a playback instruction operation for instructing the playback of picture-recorded content has been performed (Step C2). When judged that the picture-recording instruction operation has been performed (YES at Step C1), the central controlling section 11 activates the television broadcast receiving section 17 to start the reception of broadcast content (Step C3), and additionally starts a reception condition detection operation (Step C4). The central controlling section 11 then performs a picture-recording operation of the received broadcast content (Step C5), and a recording operation for detecting current reception conditions by following this picture-recording operation and for successively recording the detected current reception conditions (Step C6). Hereafter, the central controlling section 11 returns to the above-described Step C5 and performs the picture-recording operation (Step C5 to Step C7) until the end of the targeted program is detected or the completion of the picture-recorded is instructed by user operation (Step C7). As a result, the picture-recording content and the stored details of the reception condition are associated and stored.

Conversely, when judged that the playback instruction operation has been performed (YES at Step C2), the central controlling section 11 judges whether or not the intended picture-recording content selected as a playback subject has been recorded in association with a reception condition (Step C8). When judged that any reception condition has not been stored in association therewith (NO at Step C8), the central controlling section 11 proceeds to playback processing for displaying the picture-recorded content in 2D or 3D based on the display mode (Step C14). When judged that a reception condition has been stored in association therewith (YES at Step C8), the central controlling section 11 reads out this reception condition (Step C9). Then, the central controlling section 11 judges the suitability in 3D display of the picture-recorded content based on the reception condition and proceeds to processing for performing display control based on this judgment result (Step C10 to Step C14).

That is, when reading out and replaying the picture-recording content selected as the playback subject from the beginning, the central controlling section 11 reads out the reception condition from the beginning (Step C9). Then, when the reception condition is the 3D-to-2D switching threshold X or less (YES at Step C10), the central controlling section 11 switches the display mode from the 3D display mode to the 2D display mode (Step C11). When the reception condition is the 2D-to-3D switching threshold Y or more (YES at Step C12), the central controlling section 11 switches the display mode from the 2D display mode to the 3D display mode (Step C13). Next, the central controlling section 11 performs display control based on the reception condition by performing the 2D/3D display processing in accordance with this display mode (Step C14). Hereafter, the central controlling section 11 returns to the above-described Step C9 and performs the playback operation until it is detected that the picture-recorded content has been replayed to its end or the completion of the playback is instructed by user operation (Step C15). The display control processing in FIG. 7 is completed in response to this detection of completion at Step C15.

As described above, according to the second embodiment, in the playback of picture-recorded content, the suitability in 3D display of the content is judged based on the reception condition at the time of the picture-recording. Therefore, display control can be appropriately performed based on a reception condition not only when the broadcast content is replayed in real-time, but also when the picture-recorded content is replayed.

Note that, in the above-described second embodiment, an example has been given in which only a picture-recording operation is performed during picture-recording. However, broadcast content may be replayed in real-time while being picture-recorded. In this case, in addition to the recording operation of reception conditions being performed with the picture-recording operation, the suitability for 3D display is judged based on the current reception condition and the display during the real-time playback is controlled based on this judgment result as in the case of the above-described first embodiment.

Also note that, in the above-described first and second embodiments, contents not suitable for 3D display are displayed in 2D. However, the content may be displayed in 3D instead of 2D by converting the 3D depth from strong 3D depth (such as level 3) to weak 3D depth (such as level 1).

In addition, in the above-described first and second embodiments, some of the default details in the display control information storage section M3 which are set in advance by the manufacturer can be changed by user operation. However, the setting of the display control information storage section M3 may be done only by user operation.

According to the above-described first and second embodiments, in the detection of a reception condition (signal strength) based on reception signals received by the antenna, for example, whether a strong signal level has been continued for about a second or a weak signal level has been continued for about a second may be detected as the signal strength. In addition, the image quality level or the sound quality level of content based on a bit rate level during the content playback may be detected as the reception condition of the content. Alternatively, a combination of signal strength and bit rate during the playback may be detected as the reception condition. In the case of content accompanied by sound, the level of sound disturbance (interruption) during the decoding thereof may be detected as the reception condition of the content.

(Third Embodiment)

Next, a third embodiment of the present invention will be described with reference to FIG. 8.

In the above-described first embodiment, received content for 2D display is converted to content for 3D display, and the converted 3D content is displayed in 3D. In the third embodiment, in a mobile phone 1 capable of simultaneously receiving 2D display content (broadcast content) and 3D display content (broadcast content) having the same contents, 2D display broadcast content and 3D display broadcast content received as a simultaneous broadcast are switched and displayed in 2D/3D.

Note that sections that are basically the same or having the same name in the first and third embodiments are given the same reference number, and explanations thereof are omitted. Hereafter, the third embodiment will be described focusing on characteristic portions thereof.

In general, in terrestrial digital television broadcasts, a single channel allocated to each broadcast station is divided into 13 segments. Within the divided band, 12 segments are used for high image quality and high sound quality high-vision broadcasts (high-resolution 12-segment broadcasts), and the remaining 1 segment is used for mobile devices (simplified low-resolution 1-segment broadcasts). The television broadcast receiving section 17 having a dual tuner (not shown) supporting both broadcasts includes a 12-segment broadcast tuner that receives high-resolution digital television broadcasts (12-segment broadcasts) and a 1-segment broadcast tuner that receives digital television broadcasts (1-segment broadcasts) having a lower resolution than that of 12-segment broadcasts, and is configured to allow switching between the 12 seg broadcast tuner and the 1 seg broadcast tuner.

When simultaneous broadcasting is being performed on a plurality of channels, such as when a 3D display program is being broadcast on a 12-segment broadcast channel, and a 2D display program having the same contents is being broadcast on a 1-segment broadcast channel at the same time, or in other words, when a simultaneous broadcast for 3D display and 2D display is being performed, either the 3D display program broadcast or the 2D display program broadcast can be selected and viewed by switching between the 12-segment broadcast tuner and the 1-segment broadcast tuner for switching the reception channel.

Figure 8:
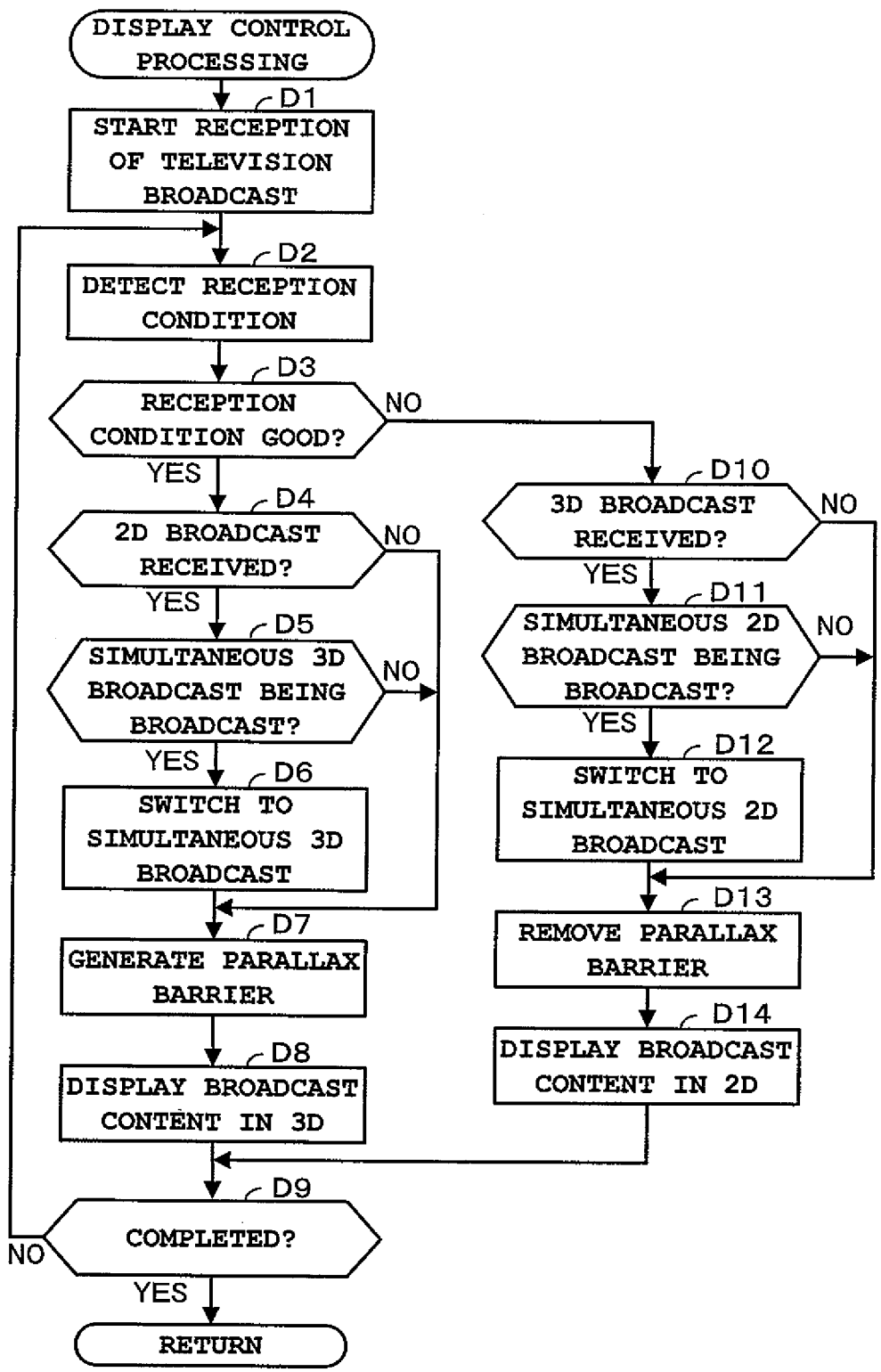
FIG. 8 is a flowchart showing display control processing that is initiated in response to the activation of a television function in a third embodiment.

FIG. 8 is a flowchart of display control processing that is initiated in response to the activation of the television function in the third embodiment.

Initially, after starting the reception of broadcast content from the television broadcast receiving section 17 (Step D1), the central controlling section 11 detects the reception condition (signal strength) (Step D2), and when the result of the detection is that the signal strength is sufficiently strong and the reception condition is good (YES at Step D3), judges whether or not 2D display broadcast content is being received (Step D4). When judged that 3D display content is being received (NO at Step D4), the central controlling section 11 proceeds to Step D7 described hereafter. When judged that 2D display content is being received (YES at Step D4), the central controlling section 11 switches the reception channel by switching from the 1-segment broadcast tuner to the 12-segment broadcast tuner on the condition that a 3D display simultaneous broadcast having the same contents as that of the received program is being broadcast (YES at Step D5), thereby switching from a 2D broadcast receiving state to a simultaneous 3D broadcast receiving state (Step D6).

Then, after generating a parallax barrier in the front layer of the display section 19 (Step D7), the central controlling section 11 displays the broadcast content in the display section 19 in 3D (Step D8). Hereafter, the central controlling section 11 returns to the above-described Step D2 and performs the display processing in accordance with the reception condition until the end of the broadcast content (end of the program) is detected or an operation instructing the completion of broadcast reception is performed (Step D9). The display control processing in FIG. 8 is completed in response to this detection of completion at Step D9.

Conversely, when the result of the detection of the reception condition (signal strength) is that the reception condition is poor (NO at Step D3), the central controlling section 11 judges whether or not 3D display broadcast content is being received (Step D10). When judged that 2D display content is being received (NO at Step D10), the central controlling section 11 proceeds to Step D13 described hereafter. When judged that 3D display content is being received (YES at Step D10), the central controlling section 11 switches the reception channel by switching from the 12-segment broadcast tuner to the 1-segment broadcast tuner on the condition that a 2D display simultaneous broadcast having the same contents as that of the received program is being broadcast (YES at Step D11), thereby switching from a 3D broadcast receiving state to a simultaneous 2D broadcast receiving state (Step D12). Then, before proceeding to processing for displaying the broadcast content in 2D, if a parallax barrier has been generated on the front surface of the display section 19, the central controlling section 11 removes this parallax barrier (Step D13), and then displays the content in the display section 19 in 2D (Step D14). Hereafter, the central controlling section 11 returns to the above-described Step D2 and performs the above-described operation until the end of the broadcast content (end of the program) is detected or an operation instructing the completion of broadcast reception is performed (Step D9).

As described above, according to the third embodiment, in the reception and output of broadcast content, 3D display program broadcast and 2D display program broadcast are switched by the 12-segment broadcast tuner and the 1-segment broadcast tuner being switched based on the current reception condition. Therefore, 2D display and 3D display can be appropriately switched by the tuner being switched.

In this instance, when 2D broadcast and 3D broadcast are being simultaneously broadcast, the broadcast content is selected by the reception channel being switched. Therefore, the selection can be smoothly and easily made.

Note that, according to the above-described third embodiment, in the reception and output of broadcast content, the reception condition (signal strength) is detected. However, this reception condition may be estimated based on the current reception location.

(Fourth Embodiment)

Next, a fourth embodiment of the present invention will be described with reference to FIG. 9 to FIG. 11.

In the above-described first embodiment, when displaying received content in the display section 19 capable of 3D display, the central controlling section 11 judges the suitability in 3D display of the content based on the reception condition at the time of the reception, and displays the content in the display section 19 in accordance with display control determined based on the suitability in 3D display. However, in the fourth embodiment, the suitability in 3D display of content is judged based on a current location at the time of playback of the targeted content by the display section 19, and the content is displayed in the display section 19 in accordance with display control determined based on the suitability in 3D display. Note that sections that are basically the same or having the same name in the first and fourth embodiments are given the same reference number, and explanations thereof are omitted. Hereafter, the fourth embodiment will be described focusing on characteristic portions thereof.

Figure 9:
FIG. 9 is a diagram for explaining the display control information storage section M3 according to a fourth embodiment.

FIG. 9 is a diagram for explaining the display control information storage section M3 according to the fourth embodiment.

The display control information storage section M3 is configured to associate and store "playback location" and "display control information". "Playback location" indicates a current location at the time of playback of targeted content. "Display control information" indicates whether content is to be displayed in 2D or 3D based on "playback location". In addition, when content is to be displayed in 3D, "display control information" indicates 3D depth (intensity) based on the suitability in 3D display. Details of the display control information storage section M3 can be optionally set by user operation, and therefore some of the default details set in advance by the manufacturer can be changed by user operation.

The "playback location" stores location information (longitudinal and latitudinal information), name of location, name of transportation, and the like as location information. In the example in FIG. 9, "home", "transportation (long-distance)", "office/school", " . . . ", and "other locations" have been stored. "Home" and "transportation (long-distance)" indicate an environment where the user can settle down and view the content closely, such as when the user is in his own room or traveling long distance by train (optimal environment for 3D display of contents). In addition, "office/school" indicates an environment fairly suitable for 3D display of content, and "Other locations" indicates an environment unsuitable for 3D display of content, such as in a crowded transportation during rush hour. The central controlling section 11 identifies the current location based on the current location acquired from the location detecting section 23 and a surrounding area map of the current location.

In the example in FIG. 9, "playback location" and "display control information" include the following details. First, "3D" has been stored in "2D/3D" and "level 3" has been stored in "3D depth" in association with "home" in "playback location". Also, "3D" has been stored in "2D/3D" and "level 1" has been stored in "3D depth" in association with "office/school" in "playback location". In addition, "3D" has been stored in "2D/3D" and "level 2" has been stored in "3D depth" in association with "transportation (long-distance)" in "playback location". Moreover, "2D" has been stored in "2D/3D"

and "level 0" has been stored in "3D depth" in association with "other locations" in "playback location".

FIG. 10 is a diagram for explaining the content storage section M4.

The content storage section M4 stores therein display information (content) to be displayed in the display section 19. For example, information, such as moving images, still images, music, and news, downloaded via the Internet 3 and the wireless communication network 2 from the information distributing device 4, and information that are broadcast programs received by the television receiving section 17 and recorded are stored as contents. This content storage section M4 is configured to store therein "title", "type", "actual data", "3D depth", and the like in association with "information identifier (ID)" that identifies content.

"Title" indicates a title related to the contents of content, and in the example in FIG. 7, it includes "two-dimensional code", "field day 2008", "J-League match", "sample moving image", "sample still image**", and the like. "Type" is type information indicating whether the content is moving image content or still image content. "Actual data" refers to actual data of content. Some contents only have actual data of which the "3D depth" is "level 0 (2D display)", while other contents may have actual data with each 3D depth. That is, some contents have actual data for each 3D depth (including for 2D display) although the contents are the same, and other contents only have actual data of which the 3D depth is "level 0 (2D)". "Level 0 (2D)" indicates that 3D depth is "level 0 (zero)" and is 2D (flat).

As just described, a plurality of contents having the same contents with various 3D depths is prepared. The central controlling section 11 selects content with a predetermined 3D depth from among the plurality of contents, and after reading out the "actual data" from the content storage section M4, displays the "actual data" in the display section 19 in 3D. Regarding content having a 3D depth that is not stored in the content storage section M4, 2D content having the same contents is converted to content with the predetermined 3D depth and the converted content is displayed in 3D.

Figure 11:
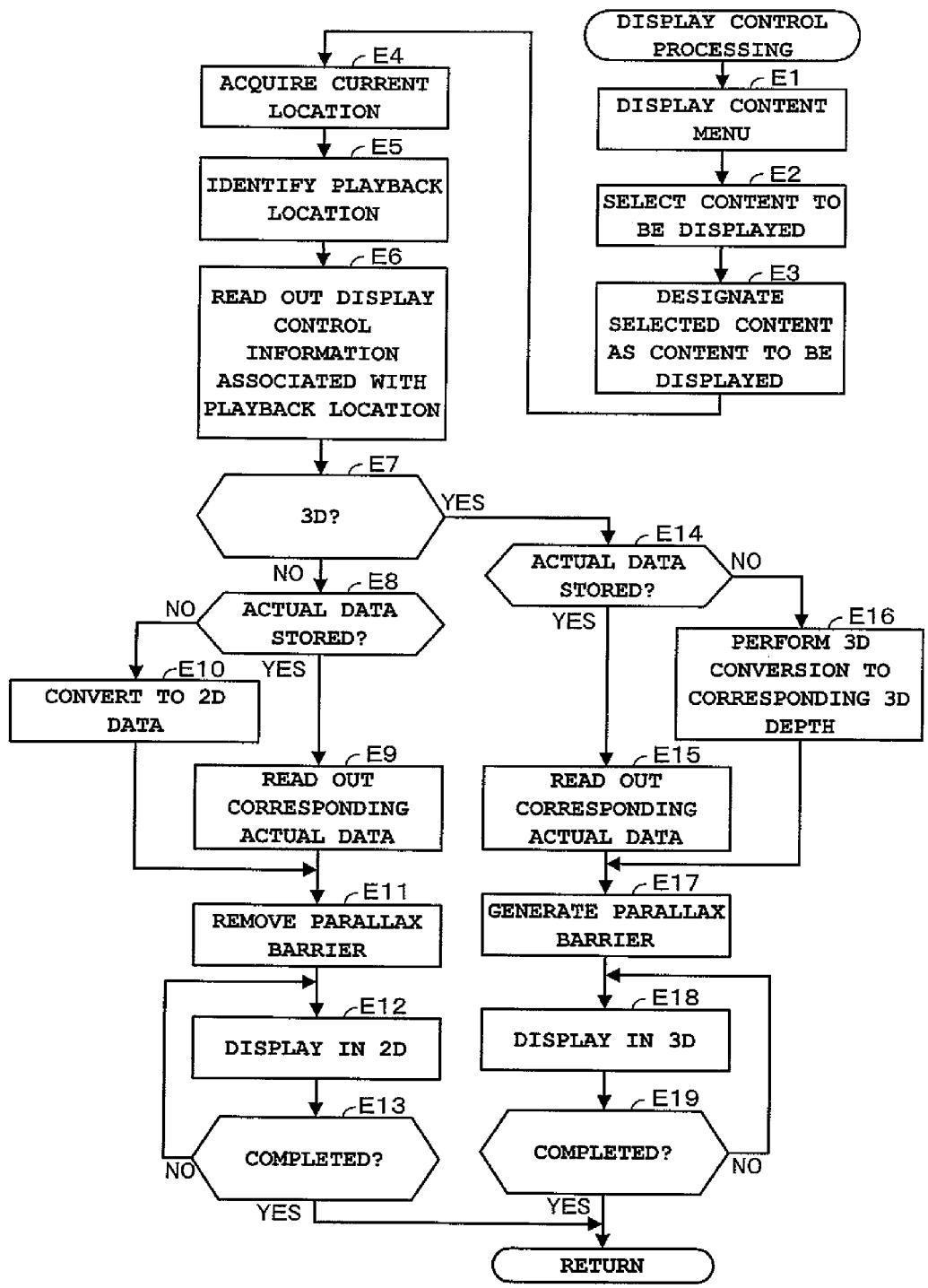
FIG. 11 is a flowchart of display control processing that is initiated in response to a content playback operation in the fourth embodiment.

FIG. 11 is a flowchart of display control processing that is initiated in response to a content playback operation in the fourth embodiment.

Initially, the central controlling section 11 reads out "title" in the content storage section M4 and displays a menu, in response to the content playback operation (Step E1). Then, when an intended content to be displayed is selected from the menu screen by user operation (Step E2), the central controlling section 11 designates the selected content as a display subject (Step E3), and after acquiring the current location information from the location detecting section 23 (Step E4), identifies the "playback location" corresponding to the current location by referencing the current location, the surrounding area map of the current location, and the display control information storage section M3 (Step E5), and then reads out the "display control information" associated with the "playback location" (Step E6).

Next, the central controlling section 11 references the "2D/3D" of the "display control information" associated with the "playback location", and judges whether or not "3D" has been set therein (Step E7), or in other words, judges whether or not the content is suitable for 3D display. Here, when the location corresponding to the current location cannot be identified, the central controlling section 11 reads out the "display control information" associated with "other locations" as the "playback location", and since the "2D/3D" thereof is "2D", judges that the content is unsuitable for 3D display (No at Step E7). The central controlling section 11 then searches the content storage section N4, and if 2D "actual data" has been stored (YES at Step E8), reads out the "actual data" (Step E9). If 2D "actual data" has not been stored (NO at Step E8), the 2D/3D conversion processing section 20 converts the 3D "actual data" to 2D data (Step E10).

Note that, instead of the 3D "actual data" being converted to 2D data, the "actual data" with the weakest depth (closest to 2D) may be selected from among a plurality of "actual data" with different 3D depths, and converted to 2D data. Next, the central controlling section 11 proceeds to processing for performing 2D display. At this point, if a parallax barrier has been generated on the front surface of the display section 19, the central controlling section 11 displays the content in the display section 19 in 2D (Step E12) after removing the parallax barrier (Step E11). Hereafter, until the termination of the content display is instructed (YES at Step E13), the central controlling section 11 displays the selected content in 2D (Step E18 and Step E19).

For example, when the "playback location" is other than "other locations", since "2D/3D" of the "display control information" associated with this "playback location" is "3D" (YES at Step E7), the central controlling section 11 searches the content storage section M4 based on the corresponding "3D depth" and judges whether or not "actual data" in 3D corresponding to the "3D depth" is present (Step E14). Note that some contents only have actual data of which the "3D depth" is "level 0" while other contents have "actual data" with each 3D depth. When "actual data" in 3D that corresponds to the "3D depth" has been stored (YES at Step E14), the central controlling section 11 reads out this "actual data" (Step E15), and after generating a parallax barrier in the front layer of the display section 19 (Step E17), proceeds to processing for performing 3D display, and displays the "actual data" in the display section 19 in 3D (Step E18). Hereafter, until the termination of the content display is instructed (YES at Step E19), the central controlling section 11 displays the selected content in 3D (Step E18 and Step E19).

When "actual data" in 3D that corresponds to the "3D depth" has not been stored (NO at Step E14) or, in other words, only "actual data" with another 3D depth (such as the depth "level 1") has been stored, the 2D/3D conversion processing section 20 converts the "actual data" with this other 3D depth to content having 3D depth in accordance with the "playback location". Then, as in the case described above, after generating a parallax barrier in the front layer of the display section 19 (Step E17), the central controlling section 11 displays the content in the display section 19 in 3D (Step E18). Hereafter, until the termination of the content display is instructed (YES at Step E19), the central controlling section 11 displays the selected content in 3D (Step E18 and Step E19).

As described above, in the fourth embodiment, the suitability in 3D display of content is judged based on a current location at the time of playback of the targeted content by the display section 19, and the content is displayed in the display section 19 in accordance with display control determined based on the suitability in 3D display. Therefore, a suitable display ranging from an easy-to-view 2D display to a realistic 3D display can be actualized based on a current location at the time of content playback. In this instance, when the user is in an environment where he can settle down and view the content closely, such as when he is in his own room or traveling long distance by train, a realistic 3D display can be enjoyed.

Specifically, the following effects can be obtained.

Since suitability for 3D display is judged based on whether or not a current location at the time of content playback matches a predetermined location set in advance, 3D display can be performed at a predetermined location or a location other than the predetermined location.

Also, since control is performed regarding whether content is to be displayed in 2D or in 3D based on the suitability in 3D display, 2D display and 3D display can be appropriately switched.

In addition, since 3D display is performed by 3D depth indicating the depth of 3D or the extent of outward projection being determined based on suitability in 3D display, 3D depth can be controlled based on the contents of content.

Moreover, since 3D depth is determined in accordance with the level of suitability in 3D display, content more suitable for 3D display can be displayed with a stronger 3D depth.

Furthermore, since the details of the display control information storage section M3 for judging suitability for 3D display can be optionally set by user operation, a realistic 3D display can be actualized based on user preference.

Note that, in the above-described fourth embodiment as well, a display control flag CF, by which whether or not to perform display control based on suitability for 3D display (ON/OFF) can be optionally selected by user operation, may be provided. As a result, whether or not to perform display control in accordance with suitability for 3D display can be controlled in accordance with user request.

Also note that, in the above-described fourth embodiment as well, a display control flag CF, by which whether to switch between 2D display and 3D display or change 3D display depth can be selected, may be provided. As a result, whether to switch between 2D display and 3D display or change 3D display depth can be controlled in accordance with user request.

In the above-described fourth embodiment, when "actual data" with determined 3D depth has not been stored, actual data with another 3D depth is converted to actual data with the determined 3D depth. However, a request for actual data with the determined 3D depth may be made to the information distributing device 4 to receive actual data with the determined 3D depth.

Also, in the above-described fourth embodiment, some of the default details in the display control information storage section M3 which are set in advance by the manufacturer can be changed by user operation. However, the setting of the display control information storage section M3 may be done only by user operation.

(Variation Examples of the Present Invention)

Next, the following variation examples of the present invention are possible.

In each of the above-described embodiments, as an example method for performing 3D display of 3D content, a method is described in which content for the right eye and content for the left eye in accordance with the 3D depth of 3D content are simultaneously displayed, and a parallax barrier in accordance with the 3D depth is generated in the front layer of the display section 19 to allow the content to be correctly viewed in 3D. However, an optional 3D display method may be used such as a method for performing 3D display by applying a visual effect that makes content appear three-dimensional.

Also, the storage section 13 may be an optional external storage device such as a memory card or an external hard disk, and the display section 19 may be an optional external display device such as an external monitor. In addition, the terminal device is not limited to the mobile phone 1 and may be an optional terminal device such as a personal computer, a personal digital assistant (PDA), a digital camera, or a music player. Moreover, the terminal device is not limited to a folding-type, and an optional casing structure such as a straight-type, a sliding-type, and a rotating-type may be used.

In addition, the "devices" or the "units" described in each of the above-described embodiments are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A terminal device having a display section capable of performing three-dimensional display, comprising:
    a central processing unit;
    a content receiver which receives content to be displayed in the display section via a broadcast;
    a signal strength acquirer which acquires a signal strength of a reception signal of the content at a time when the content is being received;
    storage configured to store first criteria for judging suitability for three-dimensional display of received content based on the signal strength and second criteria for determining depth level of three-dimensional display based on the signal strength;
    a judgment section which judges suitability for three-dimensional display of the received content based on the signal strength acquired by the signal strength acquirer and the first criteria;
    a determination section which determines the depth level of three-dimensional display in accordance with the judged suitability for three-dimensional display and the second criteria stored in the storage, said depth level of three-dimensional display being an intensity of the three-dimensional display depth of an entirety of the display; and
    a display controller which displays the received content in the display section in accordance with the determined depth level of three-dimensional display.

2. The terminal device according to claim 1, wherein the suitability for three-dimensional display is further categorized by a plurality of judgment conditions for determining whether one of (i) three-dimensional display mode and (ii) two-dimensional display mode is suitable for displaying the received content in the display section.

3. The terminal device according to claim 1, further comprising:
    a distance acquirer which acquires a distance between a current location of the terminal device and a location of a broadcast station;
    wherein the storage stores third criteria for judging suitability for three-dimensional display of received content based on the distance and fourth criteria for determining depth level of three-dimensional display based on the distance, and
    wherein the judgment means judges suitability for three-dimensional display of the received content based on the distance acquired by the distance acquirer.

4. The terminal device according to claim 1, wherein the content receiver receives content via a network.

5. The terminal device according to claim 1, further comprising: a content recorder which records the content received by the content receiver,
    wherein the content recorder records the signal strength acquired by the signal acquirer in association with the received content, and
    wherein the judgment section judges suitability for three-dimensional display of the content based on the signal strength recorded by the content recorder.

6. The terminal device according to claim 1, wherein the content receiver comprises a first receiver for receiving two-dimensional content and a second receiver for receiving three-dimensional content,
wherein the determination section determines display control based on whether the two-dimensional content received by the first receiver is selected or the three-dimensional content received by the second receiver is selected, when determining display control based on the suitability for three-dimensional display judged by the judgment section.

7. The terminal device according to claim 6, wherein the first receiver and the second receiver are broadcast receivers for receiving broadcast content as the content and each of which receive broadcast content of a different reception channel,
wherein the determination section determines display control based on whether a first reception channel received by the first receiver is selected or a second reception channel received by the second receiver is selected.

8. The terminal device according to claim 1, wherein the determination section determines display control regarding whether to display the content in the display section by two-dimensional display or by three-dimensional display based on the suitability for three-dimensional display judged by the judgment section.

9. The terminal device according to claim 1, further comprising:
a setting section for optionally setting by user operation information used to judge suitability for three-dimensional display of the content, as display control information,
wherein the judgment section judges suitability for three-dimensional display of the content based on whether contents of the content equal the display control information.

10. The terminal device according to claim 1, further comprising:
a first selector for optionally selecting by user operation whether to perform display control based on the suitability for three-dimensional display,
wherein the display control means controller controls execution of the display control based on a choice of whether to perform the display control selected by the first selection mean selector.

11. The terminal device according to claim 10, further comprising:
a second selector for selecting whether to perform display control that switches display between two-dimensional display and three-dimensional display, or to perform display control that changes the three-dimensional display depth level,
wherein the display controller performs display control in accordance with a selection result by the second selection mean selector.

12. A non-transitory computer-readable storage medium having stored thereon a program that is executable by a computer, the program being executable by the computer to perform a process comprising:
processing for receiving content to be displayed in a display section from a broadcast;
processing for acquiring a signal strength of a reception signal of the content at a time when the content is being received;
processing for storing first criteria for judging suitability for three-dimensional display of received content based on the signal strength and second criteria for determining depth level of three-dimensional display based on the signal strength;
processing for judging suitability for three-dimensional display of the received content based on the acquired signal strength and the first criteria;
processing for determining the depth level of three-dimensional display in accordance with the judged suitability for three-dimensional display depth, said depth of three-dimensional display being an intensity of the three-dimensional display depth level of an entirety of the content; and
processing for displaying the received content in the display section in accordance with the determined depth level of three-dimensional display.

* * * * *